(12) United States Patent
Razumov

(10) Patent No.: US 7,467,098 B2
(45) Date of Patent: Dec. 16, 2008

(54) RETAIL SYSTEM COMBINING RETAIL STORES WITH ELECTRONIC PRODUCT ORDERING

(76) Inventor: Sergey N. Razumov, Electricheskiy Pereulok, dom 8, korpus 4, kvartira 7, Moscow (RU)

( * ) Notice: Subject to any disclaimer, the term of this patent is extended or adjusted under 35 U.S.C. 154(b) by 586 days.

(21) Appl. No.: 10/123,166

(22) Filed: Apr. 17, 2002

(65) Prior Publication Data

US 2003/0200148 A1 Oct. 23, 2003

(51) Int. Cl.
*G06Q 30/00* (2006.01)
(52) U.S. Cl. .......................... 705/26; 705/37
(58) Field of Classification Search .................... 705/26
See application file for complete search history.

(56) References Cited

U.S. PATENT DOCUMENTS

2002/0035512 A1 * 3/2002 Pavlik ......................... 705/26

2003/0009392 A1 * 1/2003 Perkowski ................... 705/26

OTHER PUBLICATIONS

Baum, David, Au Bon Pain Gains Quick Access to Sales Data. InfoWorld. San Mateo: Aug. 10, 1992. vol. 14, Iss. 32; p. 46, 1 pgs, downloaded from ProQuest on the Internet on Mar. 29, 2008.*

* cited by examiner

*Primary Examiner*—James Zurita
(74) *Attorney, Agent, or Firm*—McDermott Will & Emery LLP

(57) ABSTRACT

A novel retail system that combines a computer-implemented product ordering system for enabling customers to order all products available in the retail system, and a plurality of retail stores for selling a limited number of items selected among the products available for ordering through the product ordering system. A computer-implemented management system provides coordinative merchandise management in the product ordering system and the retail stores. The retail system includes a plurality of retail facilities including the retail stores, and having product ordering terminals and product-obtaining areas for enabling customers to order products and pick up products ordered in advance.

22 Claims, 7 Drawing Sheets

RETAIL SYSTEM COMBINING RETAIL STORES WITH ELECTRONIC PRODUCT ORDERING

FIELD OF THE INVENTION

The present invention relates to retail systems and, more particularly, to a retail system that combines electronic product ordering with stores provided for retail sale of goods.

BACKGROUND OF THE INVENTION

Multiple Web servers have been developed for conducting electronic commerce via the Internet. They enable vendors to advertise and sell various products to be delivered through a carrier or mail. A server computer system may provide an electronic version of a catalog that lists available items. A user may browse through the catalog using a browser and select various items to be purchased.

In addition, it would be desirable to provide customers with ability to buy certain goods immediately without ordering in advance. Therefore, a need exist for a retail system that would combine product ordering with the stores that keep goods for retail sale.

However, it is well known that the most expensive place to hold merchandise is on the shelf of a retail store because of all resources it consumes until that point, such as labor, transportation, and storage costs.

In addition, consumer study conducted by Anderson Consulting (now Accenture) and the Food Marketing Institute (FMI) showed that of the products consumers want in a grocery store, 6% to 8% are out-of-stock. For promotional items, this number jumps to 25% out-of-stock products. The study concluded that the out-of-stock levels add up to about $100 billion in lost sales for retailers.

Therefore, there is a need for coordinative merchandise management in a product-ordering system and retail stores to provide right product mix on the shelves but avoid stocking the retail stores with excessive amount of products.

Further, the traditional Internet-based system for placing purchase orders requires many interactions between the user and the server carried out via the Internet. As a result, the Internet-based purchase ordering becomes slow and cumbersome.

In addition, each purchase order transaction requires the transmission of sensitive user's information over the Internet. However, when the sensitive information is transmitted over the Internet, it can be intercepted and stolen.

Therefore, there exists a long-felt need for a product-ordering system that would alleviate the difficulties of Internet-based purchase ordering and avoid the transmission of the sensitive information over the Internet.

To manage a retail system combining product ordering with retail stores, it would be desirable to provide an efficient management system that enables a manager at a central location to coordinate inventory and merchandise management in each retail store, and in the product-ordering system, in order to meet customers' demand without having to stock retail stores with excessive amount of products.

SUMMARY OF THE INVENTION

The present application provides a novel retail system combining a computer-implemented product ordering system for enabling customers to order all products available in the retail system, and a plurality of retail stores for selling a limited number of items selected among the products available for ordering through the product ordering system. A computer-implemented management system provides coordination of merchandise management in the product ordering system and the retail stores.

The retail system may include a plurality of retail facilities including the retail stores, and having product ordering terminals and product-obtaining areas for enabling customers to order products and pick up products ordered in advance. As the retail store is arranged at the same facility with the product obtaining area, products supplied to the retail store may be frequently delivered from a storage facility, together with products ordered by customers. No additional transportation is required.

Hence, the present invention enables a retailer to meet customers' demand at particular locations without having to stock retail stores with excessive amount of products at those locations.

The management system may be configured to manage merchandise in the retail stores in accordance with demand for the products in the product ordering system. In particular, the management system may manage merchandise of a retail store located in a particular region in accordance with demand for products ordered through the product ordering system in this region. For example, merchandise in a retail store may be managed based on demand for products ordered using product ordering terminals located in the retail facility that includes this retail store.

The management system may control the arrangement of products, i.e. product positioning, in retail stores and in the product ordering system. For example, the management system may enable a manager at a central location to simultaneously modify the arrangement of products on the shelves of the plurality of the retail stores.

Alternatively, the arrangement of products on the shelves of a retail store located in a particular region may be modified in accordance with demand for products ordered through the product ordering system in this region.

The retail facilities may include showcases for displaying samples of products available for ordering through the product ordering system. The management system may enable a manager at a central location to simultaneously modify arrangement of the samples in a plurality of the retail facilities. For example, the management system enables retailer to arrange weekly expositions demonstrating samples of various groups of products in multiple retail facilities simultaneously. For example, during one week, the retailer may arrange exposition showing samples of all types of pasta available for ordering. During another week, the retailer may arrange exposition showing samples of all types of pastry available for ordering, etc.

In accordance with one aspect of the invention, a management system for retail system combining product ordering and retail sale comprises an ordering management mechanism for handling products in a product ordering system that enables customers to order all products available in the retail system, and a retail management mechanism for controlling from a central location inventory and merchandise in a plurality of retail stores that keep for retail sale, without requiring customers to order in advance, a limited number of items selected among the products available in the retail system.

For example, the retail management mechanism may modify from a central location structure of the plurality of retail stores, simultaneously, and/or modify arrangement of products on shelves of the plurality of retail stores, simultaneously.

Also, the retail management mechanism may simultaneously modify from a central location arrangement of samples representing products available for ordering through the product ordering system, in a plurality of retail facilities that enable customers to order the products.

The management system may include an image handling mechanism for simultaneous handling images representing products available for retail sale and products available for ordering through the product ordering system.

In accordance with another aspect of the invention the following steps are carried out for selling goods:

enabling customers to order products, keeping a limited number of items available for retail sale without ordering, and providing coordinative control of inventory available for retail sale and inventory available only for ordering.

Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and entities are shown in block diagram form in order to avoid unnecessarily obscuring the present invention.

Figure 1:
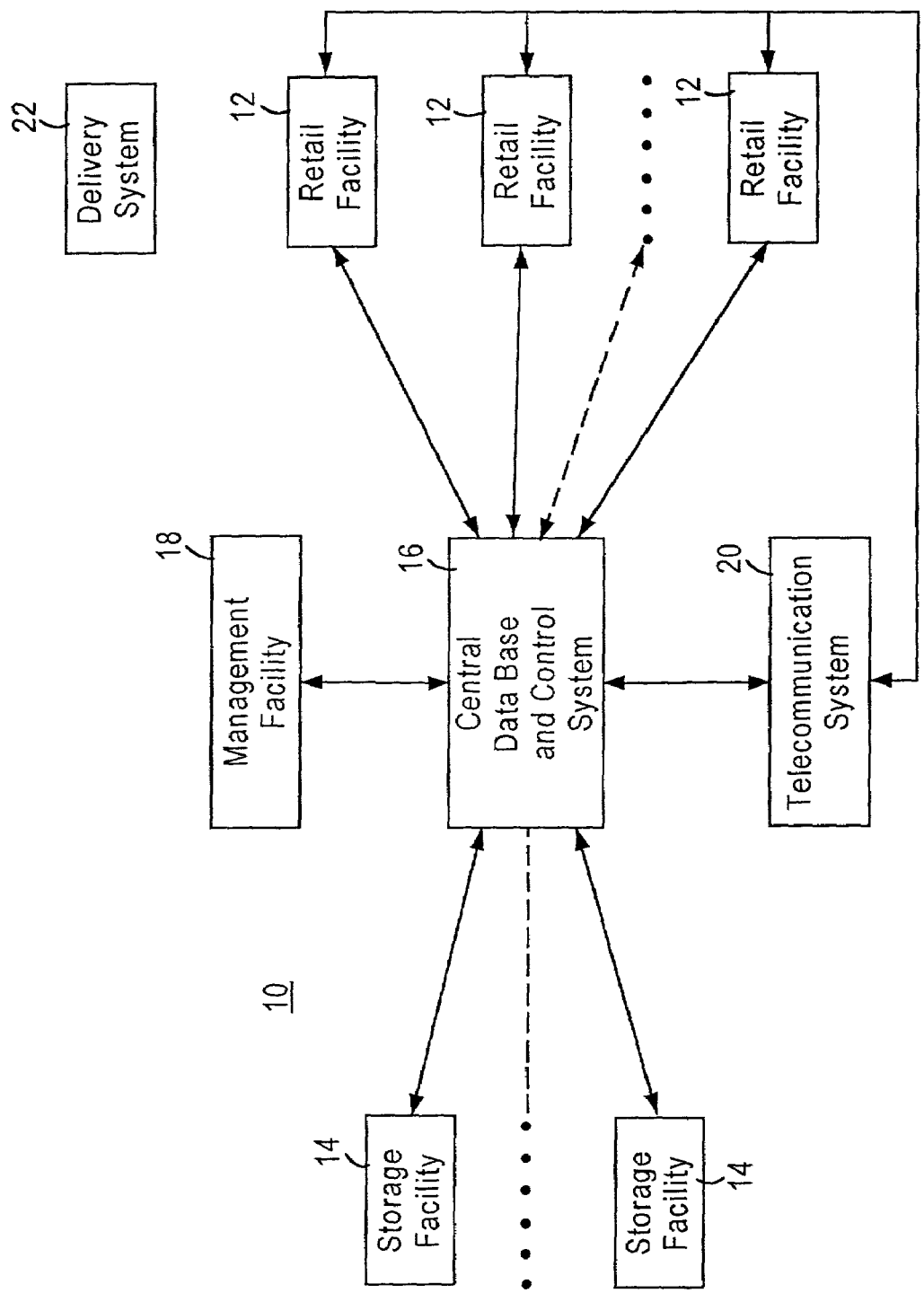
FIG. 1 illustrates a retail system of the present invention.

As schematically illustrated in FIG. 1, a retail system 10 of the present invention may comprise a plurality of retail facilities 12 for enabling customers to order and/or receive purchases, a plurality of storage facilities 14, a central data base and control system 16, a management facility 18, and a telecommunications system 20, such as an Internet-based communications network. A delivery system 22 may be provided to enable delivery of goods to the storage facilities 14, and from the storage facilities 14 to the retail facilities 12. For example, the retail system 10 of the present invention may sell such items as food products, consumer goods, video/audio products, books, clothing, etc.

As disclosed in more detail below, the retail facilities 12 enable a customer to place an order for a purchase, and provide the check-out of the purchase ordered by the customer in advance. In addition, the retail facilities 12 include retail stores keeping goods that may be purchased by customers without ordering in advance.

Alternatively, as disclosed in more detail below, an order for a purchase may be placed from a location remote with respect to the retail facility 12, such as a customer's place of residence or business, using a telecommunications network such as the Internet, or a regular telephone system.

In accordance with the present invention, a location for placing an order for a purchase is independent from the location where the ordered purchase may be checked out and picked up. While a customer may place an order and receive the ordered purchase at the same retail facility 12, the customer is enabled to order a purchase at one retail facility 12, and receive the ordered purchase at another retail facility 12. For example, a customer may place a purchase order at the retail facility 12 located near the customer's place of business, and receive the ordered purchase at the retail facility 12 located near the customer's residence.

The storage facilities 14 are provided for storing goods that may be ordered by customers. Also, the storage facilities 14 may supply products to stock retail stores arranged at the retail facilities 12.

The delivery system 22 provides delivery of the packages to retail facilities 12, or to any other location chosen by the customer. The delivery system 22 may include a number of transportation units, such as tracks or other vehicles, for transporting products to a required destination.

One storage facility 14 may be provided in a particular area to supply the retail facilities 12 arranged in that area with the ordered purchases. A purchase order received from a customer may be transferred to the storage facility 14 designated to supply the retail facility 12 or other location selected by the customer for picking up the purchase.

In response to the purchase order, the designated storage facility 14 provides collecting goods ordered by the customer and packing these goods in one or more packages to be delivered to the retail facility 12 or other location selected by the customer. A time interval between placing an order for a purchase and picking up the ordered purchase should be sufficient to deliver the purchase from the corresponding storage facility 14 to the retail facility 12 or other location selected by the customer.

The central data base and control system 16 performs collection, storage and processing of data required to support operations of the retail system 10. Also, the central data base and control system 16 supports interactions between various elements of the retail system 10.

The management facility 18 performs management and administrative functions required to support operations of the retail system 10. As described in more detail below, an automatic management system may enable a manager at the management facility 18 to coordinate control of inventory of goods available for retail sale in the retail stores, and inventory of goods available through a product-ordering mechanism of the retail system 10 to meet customers' demand without having to stock the retail stores with excessive inventory of products. Also, the automatic management system may control filling shelves in all retail stores of the retail system 10 with goods available for retail sale.

In addition, the management facility 18 may monitor retail system operations to detect and correct errors and malfunctions. Also, the management facility 18 may be responsible for maintaining adequate amount of goods at the storage facilities 12, collecting and analyzing sales information, marketing, and establishing prices.

The telecommunications system 20 enables customers to place purchase orders from locations remote with respect to the retail system facilities. In particular, the retail facilities 12 of the present invention may provide the check-out of purchases ordered via the Internet or a telephone system. The telecommunications system 20 may support the customer's access to the central data base and control system 16 to receive information on product availability and prices.

To facilitate the ordering process, the customer may be provided with a data storage device, such as a CD-ROM or DVD device, which contains information on items available in the retail system 10. The telecommunications system 20 may connect the customer's data storage device to the central data base and control system 16 to update the information stored by the data storage device.

For example, the data storage device issued to a customer, or information downloaded over a data communications network, such as the Internet, to a customer's personal computer may enable the customer's computer to display graphical presentation of store's stands and shelves filled with products available for ordering. The products may be represented by images of actual products available in the retail system 10.

The telecommunications system 20 transmits information on a purchase order placed by a customer to the central data base and control system 16 for arranging purchase delivery from the respective storage facility 14 to the retail facility 12 or other location selected by the customer.

In addition, the telecommunications system 20 may support placing an order via a telephone system. In this case, a customer can place a telephone call to an operator to order a purchase composed of items selected based on the information provided by the operator or using a list of available items. The present invention enables the customer that makes a telephone purchase order to receive the ordered purchase at any retail facility 12 or any other location selected by the customer.

Hence, the retail system 10 includes an electronic product ordering system that enables a customer to order a desired product at a retail facility 12, through a data communications network, such as the Internet, or using a telephone system.

Figure 2:
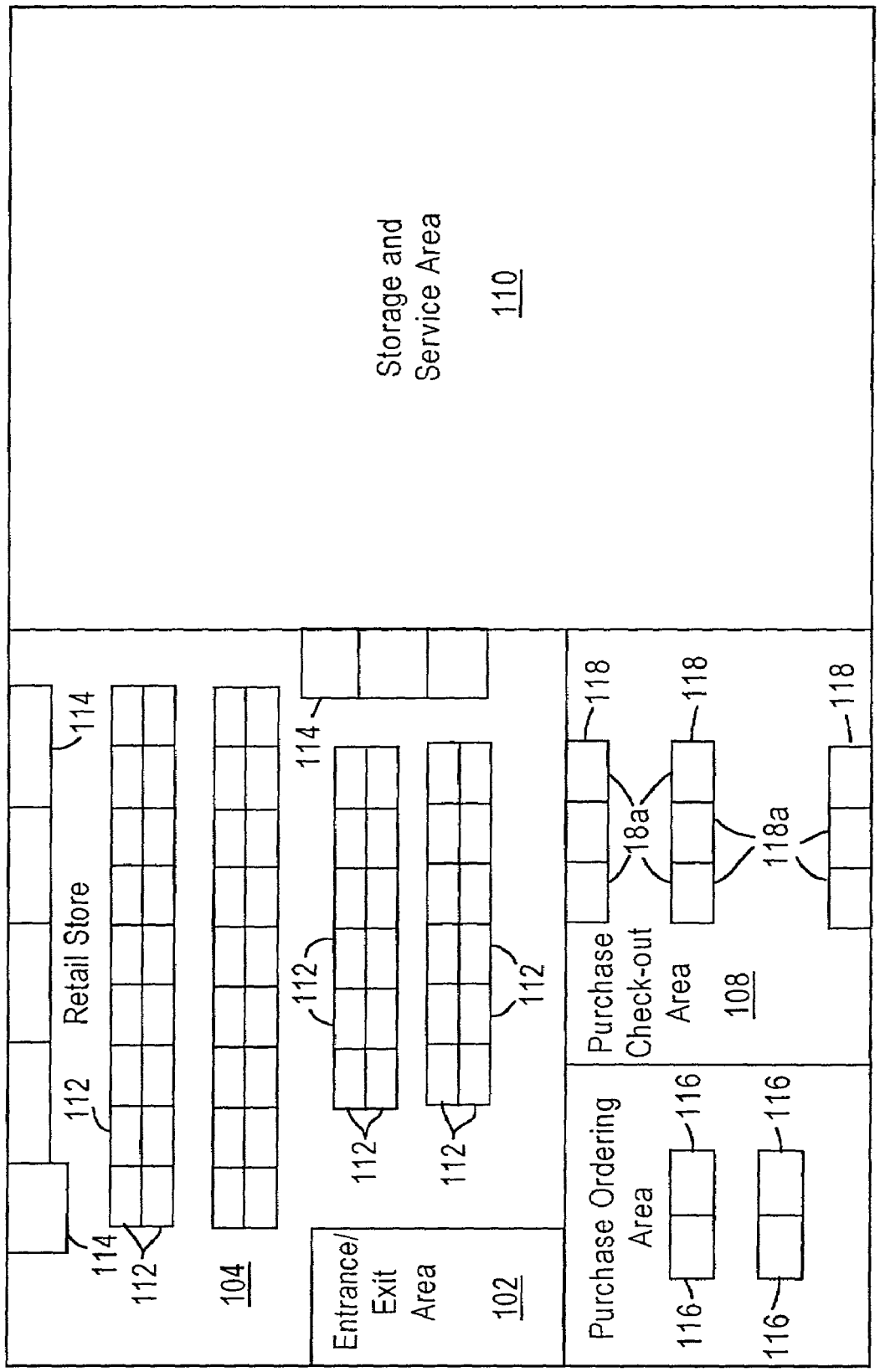
FIG. 2 illustrates an exemplary arrangement of a retail facility in the retail system.

FIG. 2 schematically illustrates an exemplary arrangement of the retail facility 12 of the present invention. In the illustrated example, the retail facility 12 combines a retail store with purchase ordering and purchase check-out facilities enabling a customer to order a purchase using an electronic purchase ordering mechanism, and to receive a purchase ordered in advance. However, the retail facility 12 may include only a retail store, only a purchase check-out facility, only a purchase ordering facility or a combination of a retail store with a purchase ordering facility and/or with a purchase check-out facility.

The retail facility 12 comprises an entrance/exit area 102 that provides customer's access to the retail facility 12 and enables the customers to exit the retail facility 12. The entrance/exit area 102 may contain a rack for storing customer's bags while the customer is in the retail facility 12. Further, the retail facility 12 may comprise a retail store 104, a purchase ordering area 106, a purchase check-out area 108, and a storage and service area 110.

The retail store 104 keeps a limited inventory of goods that may be purchased by customers without ordering in advance. For example, the retail store 104 may sell such items as food products, consumer products, video/audio products, books, clothing, etc. The retail store 104 comprises multiple stands 112 having various sizes and shapes for holding and displaying items available for sale without ordering in advance. The stands 112 may include multi-tiered structures having multiple shelves arranged in the vertical direction. As one skilled in the retail sale will realize, any types of shelves, bins, racks and the like may be used in the retail store 104 for holding goods for retail sale.

Also, the retail store 104 may include multiple showcases 114 for displaying samples of various products available in the retail system 10. One skilled in the art would realize that display racks, bins, shelves and the like may also be used to demonstrate samples of various products available in the retail system 10.

As disclosed in more detail later, the automatic management system of the present invention enables a manager at a central location to control filling with products shelves of the stands 112 in all retail stores 104 of the retail system 10 at the same time. Also, the automatic management system enables the manager to control changing product samples demonstrated in all retail stores 104 of the retail system 10 at the same time.

The purchase ordering area 106 may include purchase ordering terminals 116 that enable customers to order all goods available for ordering in the retail system 10 including the products that are not available in the retail store 104. The purchase ordering terminal 116 may provide a customer with all capabilities of a regular e-commerce Internet site with a substantially higher data processing rate, and without a security risk due to the transmission of sensitive customer's information over the Internet.

The purchase ordering terminal 116 may include a computer system interacting with a high-capacity compact memory device, such as a CD-ROM, DVD, etc. A single high-capacity memory device may be provided for multiple purchase ordering terminals 116 installed in the retail facility 12.

The memory device may contain data on all items available for sale in the retail system 10, and a program that defines an algorithm of purchase ordering using the purchase ordering terminal 116. For example, the purchase ordering algorithm may enable the terminal 116 to display graphical presentation of stands and shelves stocked with specific goods representing items that may be ordered. This graphical presentation imitates stands and shelves of a real store. The goods available for ordering may be represented by images of actual products available in the retail system. For example, photographic pictures of actual products may be used.

A customer is enabled to browse the shelves to select required items. To facilitate selection, the purchase ordering terminal may be provided with a touch-screen monitor that enables customers to make selection by touching required items displayed on the screen. As discussed in more detail below, the automatic management system of the present invention periodically updates product data on items available for ordering through the purchase ordering terminals 116 to reflect changes in the inventory.

Also, the product ordering area may include multiple showcases 114 for displaying samples of various products available for ordering in the retail system to promote these products. A product represented by such a sample may be available for purchasing immediately in order to determine customers' demand for that product. The automatic management system of the present invention enables a retailer to periodically update the products being promoted and modify the assortment of products in the retail store 104 in accordance with customers' demand determined when a particular product is represented in the showcases.

The purchase ordering facility of the present invention is disclosed in more detail in my copending U.S. patent application Ser. No. 09/745,420 filed on Dec. 26, 2000, entitled "RETAIL SYSTEM WITH PURCHASE ORDERING" and incorporated herewith by reference.

The purchase check-out area 108 is provided for customers arriving to pick-up their purchases ordered in advance. The purchase check-out area 108 contains multiple purchase pick-up stations 118 that enable customers to pick up and inspect their pre-ordered purchases, and confirm that contents of the delivered order is acceptable. Each purchase pick-up station 118 may include multiple purchase pick-up sections 11 8a arranged so as to accommodate a single customer. When a customer arrives at the retail facility, a particular pick-up section 118a is assigned to her. Simultaneously, a purchase ordered by that customer and delivered from the respective storage facility 14 is transferred from the storage and service area 110 to the purchase pick-up section 118a assigned to the customer.

The purchase check-out arrangement and operations performed to support purchase pick-up and check-out processes are described in more detail in my copending U.S. application Ser. No. 09/788,674 filed on Feb. 21, 2001, entitled Purchase Check-out Arrangement in Retail System, and incorporated herewith by reference.

As the retail store 104 is arranged at the same facility with the purchase check-out area, products supplied to the retail store 104 may be frequently delivered from the storage facility 14, together with purchases ordered by customers. Hence, the present invention enables retailer to meet customer's demand at particular locations without having to stock retail stores with excessive amount of products at those locations.

The storage and service area 110 is provided for storing products pre-ordered by customers and delivered from the corresponding storage facility 14. Also, the storage and service area 110 may store a limited inventory of goods for stocking the retail store 104. For example, the storage and service area 110 may include a dry-product storage area for keeping dry products, a freezing and refrigerating storage area provided with freezing and refrigerating chambers for storing frozen products and products that should be kept refrigerated, and a chemical product storage area for storing chemical goods.

Figure 3:
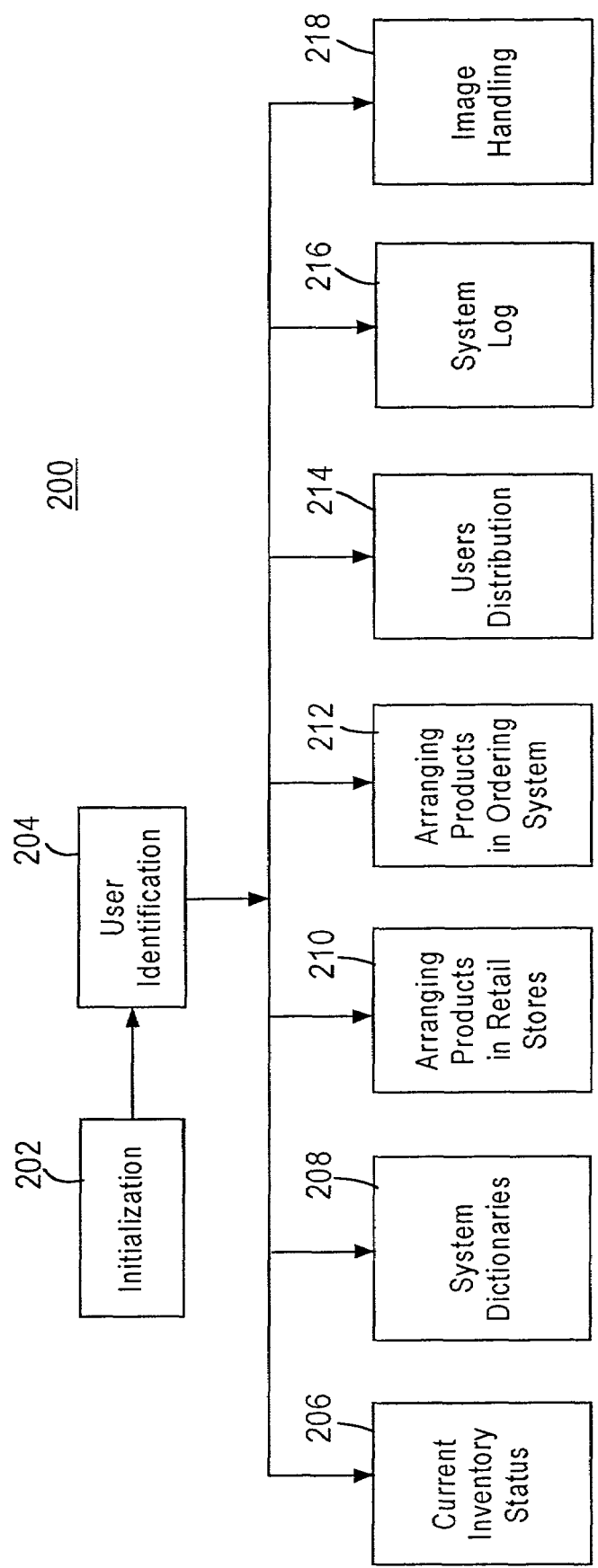
FIG. 3 is a block diagram illustrating an automatic management system of the present invention.

FIG. 3 shows a block diagram illustrating an automatic management system (AMS) 200 of the present invention that may be arranged at the management facility 18. The automatic management system 200 enables a manager at a central location to control and coordinate inventory and arrangement of products in the electronic product ordering system and in multiple retail stores of the retail system 10.

The automatic management system 200 may be implemented on a computer system including a processor and a main memory, such as a random access memory (RAM) or other dynamic storage device, for storing information and instructions to be executed by processor. Main memory also may be used for storing temporary variables or other intermediate information during execution of instructions to be executed by the processor. The computer system further includes a read only memory (ROM) or other static storage device for storing static information and instructions for the processor. A storage device, such as a magnetic disk or optical disk, is provided for storing data base of the AMS 200 and instructions.

The computer system is coupled to a display, such as a cathode ray tube (CRT), for displaying information to a computer user. Input devices, including alphanumeric and other keys, and a mouse, are coupled for communicating information and command selections to the processor. The computer system also includes a communication interface for connecting the AMS 200 to the central data base and control system 16.

Execution of the sequences of instructions contained in the main memory causes the processor to perform the process steps described herein. In alternative embodiments, hard-wired circuitry may be used in place of or in combination with software instructions to implement the invention. Thus, embodiments of the invention are not limited to any specific combination of hardware circuitry and software.

During an initialization procedure 202, the computer system checks whether the AMS 200 is ready to operate. In particular, the computer system determines whether the data base of the AMS 200 is accessible. If the AMS 200 is ready, the computer system verifies whether the user is authorized to access the AMS 200 (block 204).

The AMS 200 may operate in the following modes of operation: a current inventory status mode 206, a system dictionaries mode 208, a mode 210 of arranging products in the retail stores, a mode 212 of arranging products in the electronic product ordering system, a users distribution mode 214, a system log mode 216, and an image handling mode 218.

When the user is identified, the AMS 200 may be set into the current inventory status mode 206 to provide information on current inventory status. In this mode, the display of the computer system may display a classifier of items representing all products in the retail system 10 as a hierarchical tree. For example, the classifier may be implemented as a three-level structure, the highest level of which represents main groups of products, such as groceries, dairy products, non-alcoholic beverages, alcoholic beverages, confectionery, etc.

When any of the groups is selected, the screen of the display shows subgroups of products in the selected group. The AMS 200 may indicate the status of the groups and subgroups. For example, the screen may show whether a particular group or subgroup has a product with problems. The problems may indicate that image of a new product has not been prepared, or that a new product is not defined in the electronic product ordering system.

When a subgroup is selected, the screen shows information on particular products in the selected subgroup. The information on a product may include: identification (ID) number of the product in the selected group, ID number of the product in the product ordering system, ID number of the product in the retail system 10, and image of the product, e.g. a photographic picture of the product.

Also, the screen may show the status of each product that indicates whether the product is available in the retail stores, whether the product is available in the electronic product ordering system, whether the image representing a new product is being produced, and whether the product has problems. Further, the AMS 200 in the current inventory status mode indicates to a manager that new products are available in the retail system 10.

In the system dictionaries mode 208, the AMS 200 provides information on system dictionaries used in the AMS 200. The system dictionaries include a dictionary of stands, a dictionary of shelves, and a dictionary of users.

The dictionary of stands includes a list of all stands 112 and showcases 114 used in the retail system 10 and comprises information on each stand or showcase. This information indicates the ID information of the stand or showcase, and its length, width and height.

The dictionary of shelves includes a list of all shelves used in the retail system 10 and comprises information on each shelf indicating the ID information of the shelf, and its length and width.

As discussed above, the electronic product ordering system of the present invention may employ graphical presentations of stands and shelves filled with products available for ordering. The dictionaries of stands and shelves of the AMS 200 may contain information on the stands and shelves used in the electronic ordering system.

The dictionary of users includes a list of users authorized to access the AMS 200, and includes user name and password of each user.

In the mode 210 of arranging products in retail stores, the AMS 200 enables to position products at a store and one the shelves of the store. In particular, the AMS 200 provides information on the layout of each retail facility 12 in the retail system 10 indicating positions of stands in each retail store. Also, the AMS 200 provides information on the arrangement of products on the shelves of each retail store indicating positions of products on the shelves.

For example, the display of the AMS's computer system may present the retail system 10 as a three-level hierarchical tree. The highest level of the tree represents a list of retail facilities 12 in the retail system 10. When any of the retail facilities 12 is selected, the display shows a list of stands 112 in the selected retail facility. Also, the AMS 200 may show a list of showcases 114 contained in the selected retail facility 12 and used to display samples of various products available for ordering in the retail system 10.

Figure 4:
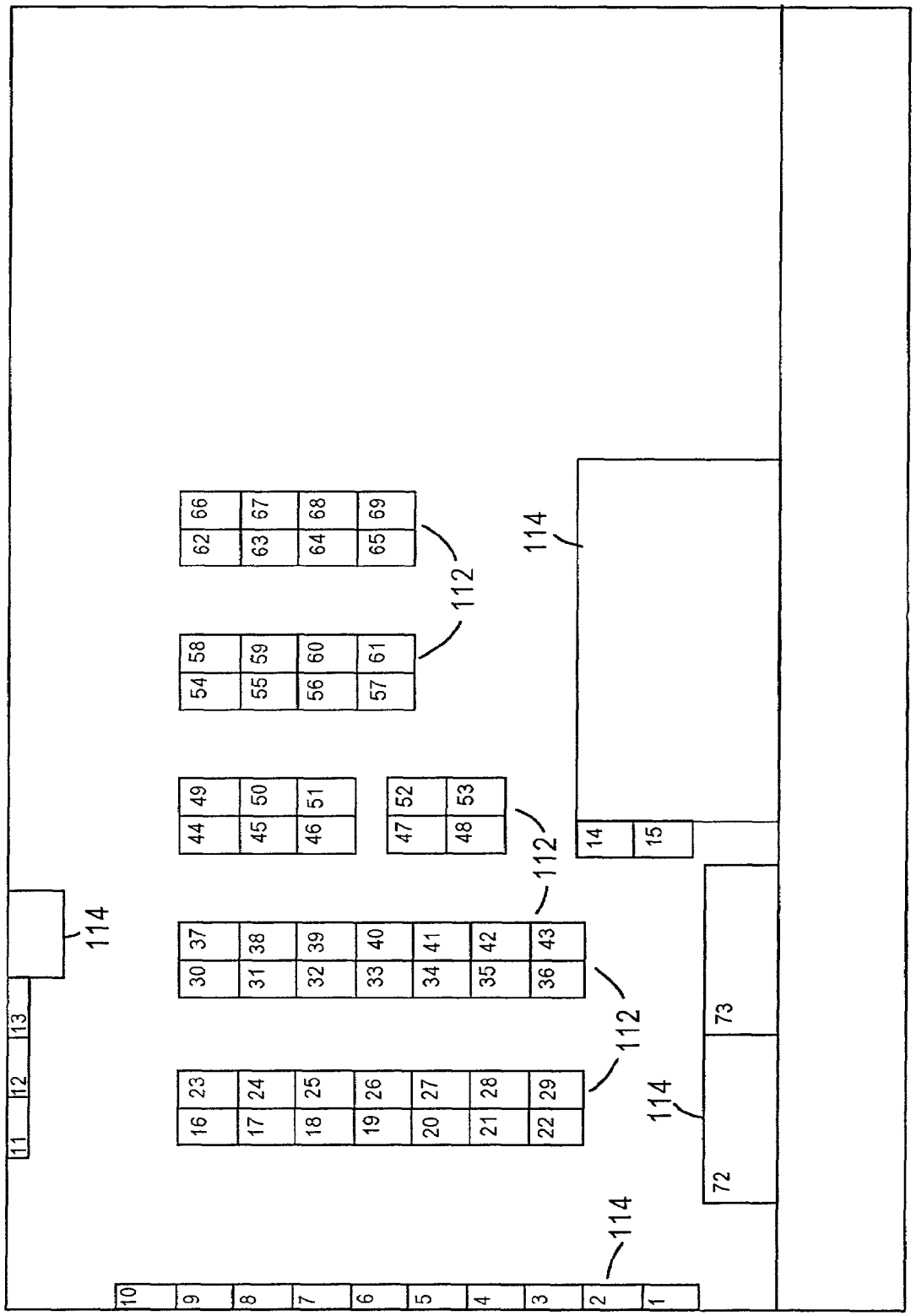
FIG. 4 illustrates the arrangement or layout of stands and showcases in the retail facility displayed on the screen of the automatic management system.

In addition, as shown in FIG. 4, the display may show the layout of the selected retail facility 12, including positions of the stands 112 and showcases 114, to enable the user to change this layout. Further, the user is enabled to add a new stand or showcase, to remove a stand or showcase, or to change parameters of particular stands or showcases, such as length, width or height.

Figure 5:
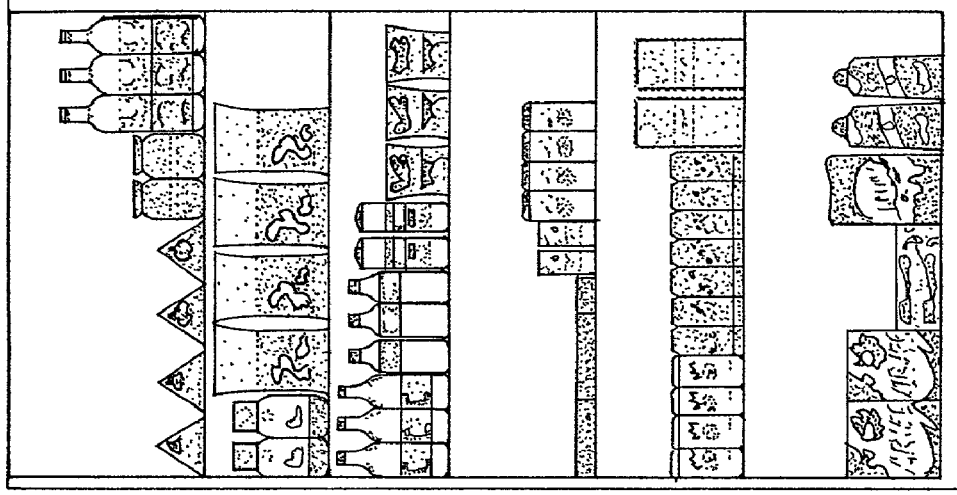
FIG. 5 illustrates the arrangement or layout of products in a stand of a retail store displayed on the screen of the automatic management system.

When any stand or showcase is selected, the display of the AMS 200 shows a list of shelves in the selected stand or showcase. Moreover, when the selected stand or showcase is activated, e.g., by double clicking using a mouse-type input device, the display shows an arrangement of products on shelves of the selected stand or showcase (FIG. 5). Each product may be represented by image of an actual product held in the respective position on the shelf. For example, photographic pictures of actual products may be displayed in the respective positions on the shelves of the selected stand or showcase. The displayed image of stand or showcase with products on its shelves represents actual arrangement of products on shelves of the selected stand or showcase in the selected retail facility 12.

Hence, the AMS 200 provides real time information on arrangement or layout of products on shelves of stands and showcases in each retail facility 12.

Figure 6:
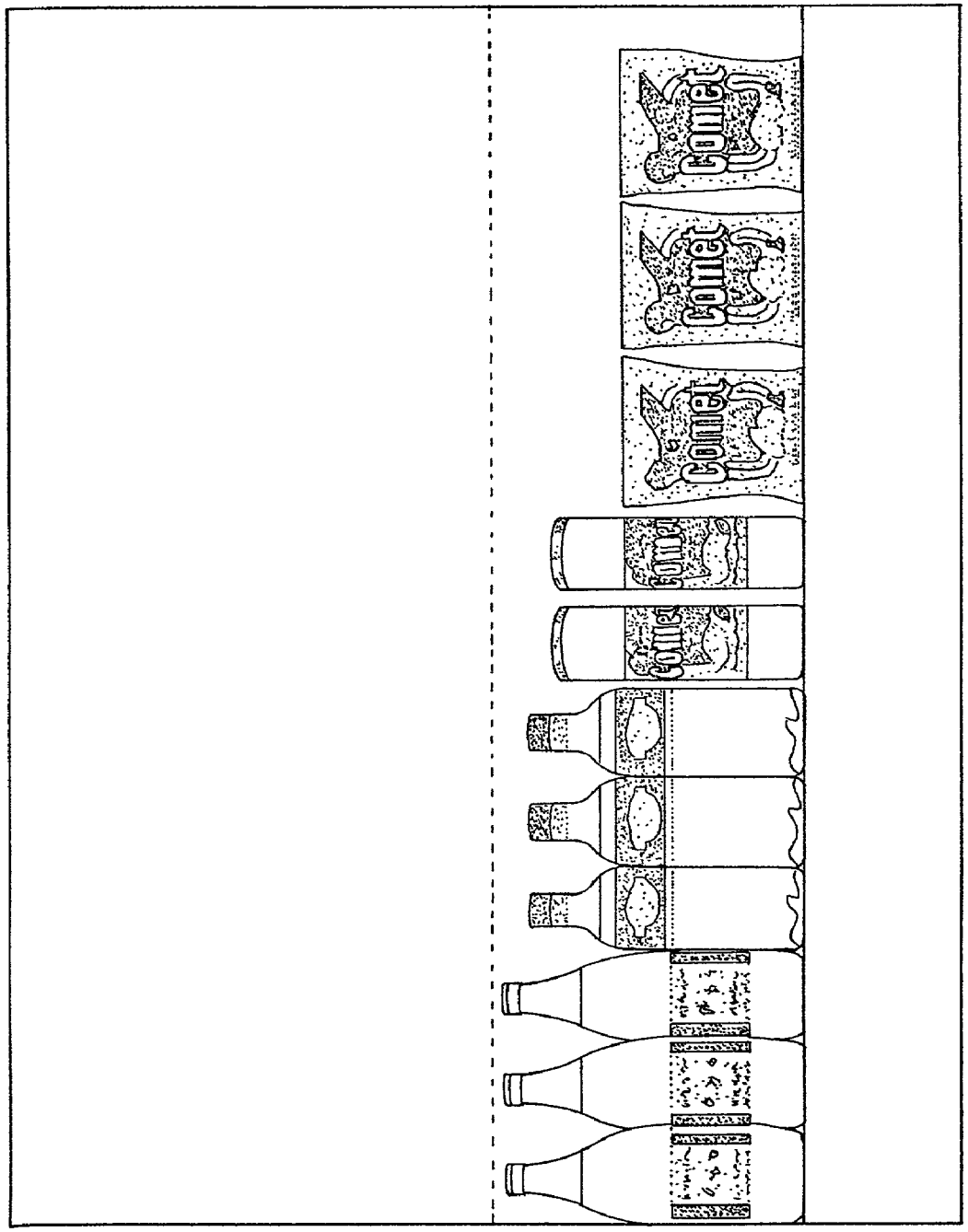
FIG. 6 illustrates the arrangement or layout of products on a shelf of the stand displayed on the screen of the automatic management system.

By selecting any shelf in the selected stand or showcase, the user is able to review arrangement of products on the selected shelf, and change this layout or parameters of the shelf. For example, as shown in FIG. 6, the AMS 200 may display the image of the selected shelf with all products arranged on the shelf. This image corresponds to the actual arrangement of products on the selected shelf of the selected stand or showcase in the selected retail facility 12.

Images of all stands and shelves with products in the AMS 200 are periodically updated by the central data base and control system 16 to reflect changes in product arrangement due to retail sale of products on the shelves.

Figure 7:
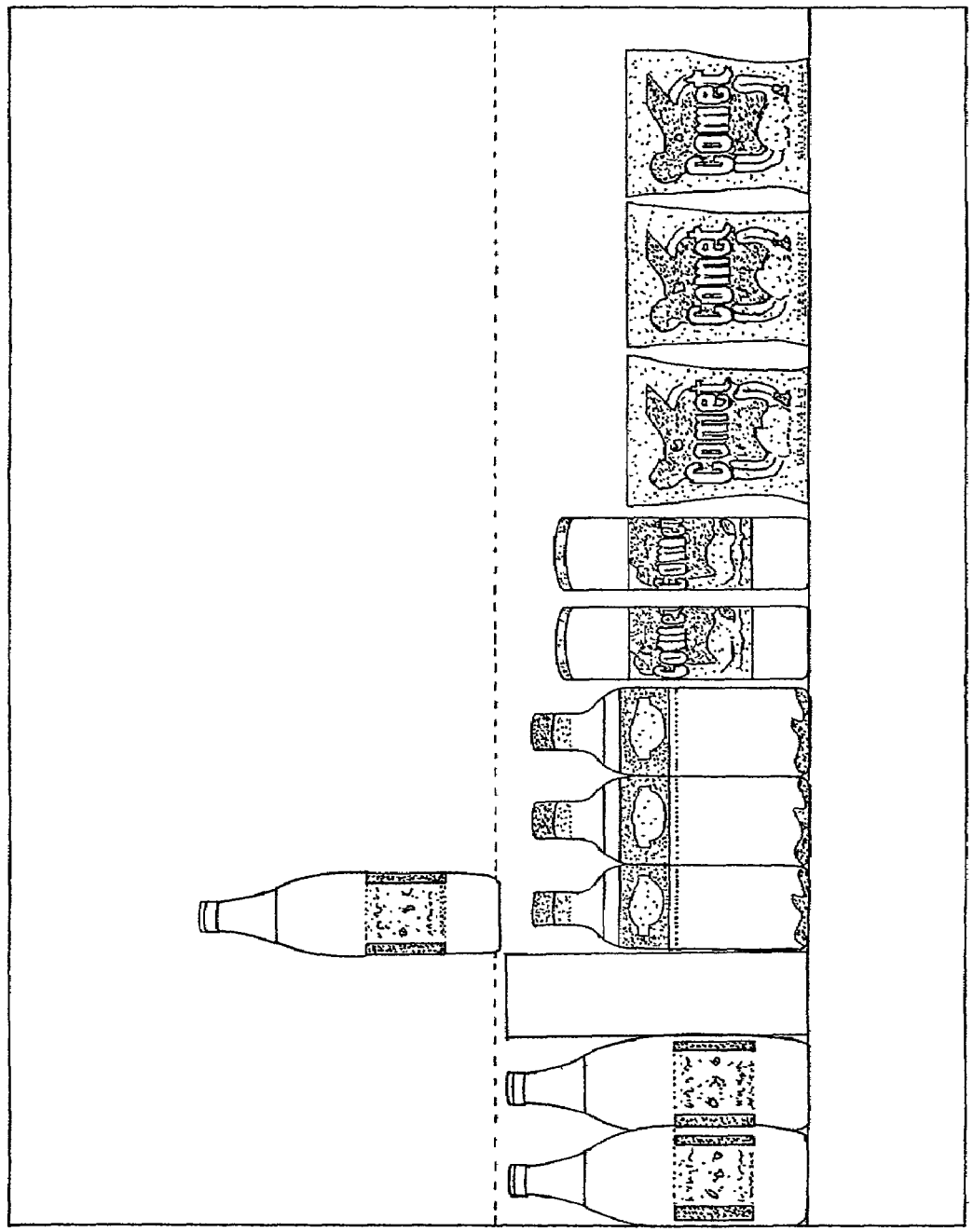
FIG. 7 illustrates modifying the arrangement or layout of products on the shelf.

The AMS 200 enables the user to add a new product on a selected shelf, remove a product from the shelf, or change arrangement of products on the selected shelf (FIG. 7). Also, the user may add or remove shelves, and change their parameters, such as width or length.

Via the communication interface of the AMS 200 and the central data base and control system 16, signals representing user's actions may be transmitted in real time to a respective retail facility 12 to instruct personnel of the retail facility as to how the structure of the retail facility, or the arrangement of products on its stands or shelves should be changed.

When the AMS 200 determines that a stand or shelf in any retail store does not have sufficient amount of a particular product, the AMS 200 automatically generates a request for delivery of a required amount of this product to the respective retail store from the storage facility 14. Also, the AMS 200 generates requests for delivery to the retail stores new products to be added on shelves of the respective retail stores. Thus, the AMS 200 provides automatic merchandise management in the retail stores in real time.

As the retail stores 104 are arranged at the same facilities with the purchase check-out areas 108, products supplied to the retail stores may be frequently delivered from the storage facility 14, together with products ordered by customers through the electronic ordering system. No additional transportation expenses are required. Therefore, there is no need to stock the retail stores 104 with excessive amount of products.

Hence, the present invention makes it possible to meet customer's demand at particular locations without having to stock retail stores with excessive amount of products at those locations.

Further, the AMS 200 enables a manager at a central location to change the arrangements of stands 112 and showcases 114 at any retail facility 12 of the retail system 12. Also, the manager at a central location is enabled to change the arrangement or layout of products on a selected shelf of any stand or showcase at any retail facility 12 of the retail system 10.

The AMS 200 may control inventory of products in the retail stores 104 in accordance with customers' demand for the respective products in the product ordering system. Using predetermined criteria, the AMS 200 may select the assortment of products in the retail stores 104 based on customers' demand for the respective products in the product ordering system. For example, a retailer may sold through the retail stores 104 products most frequently ordered through the product ordering system. Also, products to be sold through the retail stores 104 may be selected among items, which customers do not want to order through the product ordering system because these items are required immediately.

In addition, the quantity of products to be kept in the retail stores 104 may be determined based on the demand for these products in the product ordering system.

As the AMS 200 provides merchandise management and inventory control from a central location, it may take into account customers' demand for products in particular regions. More specifically, the inventory of products and arrangement of products on the shelves in a retail store 104 located in a particular region may be controlled in accordance with demand for respective products ordered by customers in this region. The demand may be determined based on the number of orders for the respective products made through the product ordering terminals 116 arranged in the retail facility 12 including that retail store 104. Also, the demand may be determined based on the number of Internet and telephone orders from customers in this particular region. Hence, the coordinative control of the retail stores and electronic ordering system enables retailer to meet customer's demand at particular locations by stocking retail stores 104 with products requested at those locations.

As discussed above, the showcases 114 display samples of products available for ordering through the product ordering system to promote those products. The AMS 200 may modify arrangement of the samples in a plurality of retail facilities 12 from a central location. For example, the AMS 200 enables retailer to arrange weekly expositions demonstrating samples of various groups of products in multiple retail facilities 12 simultaneously. For example, during one week, the retailer may arrange exposition showing samples of all types of pasta available for ordering in the retail system 10. This exposition may be simultaneously arranged in all retail facilities 12. During another week, exposition showing samples of all types of pastry available for ordering may be arranged, etc.

Products represented the samples may be available for purchasing immediately in order to determine customers' demand for that product. The automatic management system 200 of the present invention enables a retailer to periodically update the products being promoted and modify the assortment of products in the retail store 104 in accordance with customers' demand determined when a particular product is represented in the showcases.

In the mode 212 of arranging products in the electronic product ordering system, the AMS 200 displays information indicating the arrangement of products available for ordering in the retail system 10. As discussed above, the electronic product ordering system includes purchase ordering terminals 116 provided in the retail facilities 12 for enabling customers to order available goods including products, which are not available in the retail stores 104. Also, the electronic ordering system may enable customers to electronically order available goods from locations remote with respect to the retail facilities 12 using customers' electronic terminals, such as personal computers, displaying products available in the retail system 10. In addition, customers may order products using a telephone by calling to an operator that uses an electronic terminal displaying available products to select products requested by customers.

The AMS 200 enables a manager at a central location of the retail system 10 to manage the electronic ordering system by adding newly available products, removing products that are not available, and changing the arrangement of products displayed by the purchase ordering terminals 116, the customers' terminals and the operators' terminals of the telephone ordering system.

The AMS 200 displays a multi-level classifier of products, the highest level of which represents main groups of products, such as groceries, dairy products, non-alcoholic beverages, alcoholic beverages, confectionery, etc.

When any of the groups is selected, the screen of the display shows subgroups of products in the selected group. The AMS 200 may indicate the status of the groups and subgroups. For example, the screen may show whether a particular group or subgroup has a product with problems. The problems may indicate that image of a new product has not been prepared, or that a new product is not defined in the electronic product ordering system.

When a subgroup is selected, the screen shows information on particular products in the selected subgroup. The information on a product may include the name and ID number of the product, the status of the product in the electronic product ordering system, and image of the product, e.g. a photographic picture of the product, representing the product in the electronic product ordering system.

The user of the AMS 200 is enabled to change the arrangement of groups, subgroups, and products in the subgroups. For example, a legend representing a group or subgroup, or an image representing a product may be "dragged" to a different location using a pointing device, such as a mouse.

Via the communication interface of the AMS 200, signals representing the user's actions may be transmitted to the central data base and control system 16 to modify the content of the electronic product ordering system. Hence, the user of the AMS 200 is enabled to change in real time the arrangements of goods represented by the purchase ordering terminals 116, the customers' terminals and the operators' terminals of the telephone ordering system.

In the users' distribution mode 214, the AMS 200 enables a system administrator to allocate retail facilities 12 to different users of the AMS 200 responsible for managing the respective retail facilities 12.

In the system log mode 216, the AMS 200 displays information on all operations performed for managing the retail system 10, and general information on the retail system 10 including the number of retail facilities 12, the number of stands and shelves in the retail stores 104, the inventory of products in the retail stores 104 and in the product ordering system, etc.

In the image handling mode 218, the AMS 200 enables a user to review and check images representing products in the electronic product ordering system. The AMS 200 displays the list of all products in the electronic product ordering system. Each product in the list contains the index indicating the status of the image representing the product in the electronic product ordering system. For example, the index may identify the following categories of products:

a new product;
a product, the image of which is being prepared;
a product, the image of which has been prepared, and
a product compared with its image.

When a new product in the list is detected, the AMS 200 causes the generation of a request to prepare the image representing the new product. When the image has been prepared, the AMS 200 displays it to enable a user to compare the image with the respective products. If the image is satisfactory, it is entered into the product ordering system to represent the newly added product.

Hence, the retail system of the present invention enables consumers to order any product of a broad range of available goods through the product ordering system, and to buy without ordering in advance a limited number of goods available in retail stores. The arrangement of retail stores in facilities provided to enable customers to pick up product ordered through the product ordering system makes it possible to meet consumer demand without keeping excessive amount of products in the retail stores. Further, the automatic management system enhances the retail system's ability to meet consumer demand without having to stock retail stores full of products, by coordinating inventory control in the retail stores with control of the product ordering system.

Those skilled in the art will recognize that the present invention admits of a number of modifications, within the spirit and scope of the inventive concepts. For instance, the invention may be implemented in a number of different ways. For example, the automatic management system 200 may be implemented using general-purpose digital signal processors and appropriate programming. Alternatively, this system may be implemented using specifically engineered chips having logic circuits and other components for performing the functions described above.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A management system for retail system, comprising a retail management mechanism for providing from a central location merchandise management in a plurality of retail stores, the retail management mechanism being configured for:
    enabling an operator at the central location to select graphical representation of a particular retail store of the plurality of retail stores,
    displaying graphical representations of products on a product holding entity of the selected retail store,
    enabling the operator at the central location to modify arrangement of the displayed products on the product holding entity of the selected retail store by performing an operation for removing a first graphical representation of a first displayed product and replacing the first graphical representation with a second graphical representation of a second product, and
    transmitting to the selected retail store a signal representing said operation of the operator in connection with the modification of arrangement of the displayed products to indicate how arrangement of the products at the selected retail store should be changed.

2. The management system of claim 1, wherein the retail management mechanism is configured to simultaneously modify from a central location structure of the plurality of retail stores.

3. The management system of claim 1, wherein the retail management mechanism is configured to enable the operator at the central location to select multiple retail stores of the plurality of the retail stores and modify the product arrangement data representing arrangement of products at the selected multiple retail stores.

4. The system of claim 3, wherein the retail management mechanism is configured to present a layout of a retail store of the plurality of retail stores.

5. The system of claim 4, wherein the retail management mechanism is configured to enable a user to change the presented layout of the retail store.

6. The system of claim 4, wherein the retail management mechanism is configured to indicate positions of stands in the retail store.

7. The system of claim 4, wherein the retail management mechanism is configured to enable a user to change the presented positions of the stands.

8. The system of claim 4, wherein the retail management mechanism is configured to indicate positions of the products in the retail store.

9. The system of claim 8, wherein the retail management mechanism is configured to enable a user to modify the presented positions of the products.

10. The system of claim 3, wherein the retail management mechanism is configured to present the retail system as a multi-level hierarchical arrangement including a selected retail store in the retail system and a selected fixture for holding the products in the selected retail store.

11. The system of claim 3, wherein the retail management mechanism is configured to present a list of the retail stores.

12. The system of claim 3, wherein the retail management mechanism is configured to provide arrangement of products in the retail stores when a first mode of operation is selected, and to provide management of products in the product ordering system when a second mode of operations is selected.

13. The management system of claim 1, wherein the retail management mechanism is configured to simultaneously modify from a central location arrangement of samples representing products available for ordering through the product ordering system, in a plurality of retail facilities that enable customers to order the products.

14. The management system of claim 1, further comprising an image handling mechanism for simultaneous handling images representing products available for retail sale and for ordering through the product ordering system.

15. The management system of claim 1, wherein the retail management mechanism is configured to enable the operator to select a stand in the selected retail store of the plurality of retail stores.

16. The management system of claim 1, wherein the retail management mechanism is configured to enable the operator to select a shelf of a selected stand in the selected retail store of the plurality of retail stores.

17. The management system of claim 1, wherein the retail management mechanism is configured to present products on a selected shelf in the selected retail store of the plurality of retail stores.

18. The management system of claim 17, wherein the retail management mechanism is configured to add a product to the selected shelf.

19. The management system of claim 17, wherein the retail management mechanism is configured to remove a product from the selected shelf.

20. The management system of claim 1, wherein the product arrangement data representing arrangement of products on shelves of the selected store include an image of a product held in a respective position on a selected shelve of the selected store.

21. The management system of claim 1, further comprising an ordering management mechanism for handling products in a product ordering system that enables customers to order all products available in the retail system, and
    wherein the retail management mechanism is configured for providing from the central location merchandise management in the plurality of retail stores that keep for retail sale a limited number of items selected among the products available in the retail system, and the merchandise management is performed in coordination with the product ordering system.

22. The management system of claim 1, wherein the retail management mechanism is configured to provide periodically updatable product arrangement data representing arrangement of products in the plurality of retail stores.

* * * * *